(12) United States Patent
Singh et al.

(10) Patent No.: US 11,696,110 B2
(45) Date of Patent: *Jul. 4, 2023

(54) DISTRIBUTED, CROWDSOURCED INTERNET OF THINGS (IOT) DISCOVERY AND IDENTIFICATION USING BLOCK CHAIN

(71) Applicant: RaGaPa Inc., Sunnyvale, CA (US)

(72) Inventors: Gagandeep B. Singh, Dublin, CA (US); Ravinder S. Virk, Oakland, CA (US); Parvinder S. Bhasin, Hayward, CA (US)

(73) Assignee: RaGaPa Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,763

(22) Filed: Aug. 12, 2021

(65) Prior Publication Data

US 2022/0174469 A1 Jun. 2, 2022

Related U.S. Application Data

(63) Continuation of application No. 16/570,949, filed on Sep. 13, 2019, now Pat. No. 11,122,411.
(Continued)

(51) Int. Cl.
H04W 8/00 (2009.01)
G06F 16/182 (2019.01)
H04W 4/70 (2018.01)

(52) U.S. Cl.
CPC ........ *H04W 8/005* (2013.01); *G06F 16/1824* (2019.01); *G06F 16/1834* (2019.01); *H04W 4/70* (2018.02)

(58) Field of Classification Search
None
See application file for complete search history.

(56) References Cited

U.S. PATENT DOCUMENTS

2018/0332017 A1  11/2018 Childress et al.
2019/0036906 A1   1/2019 Biyani et al.
(Continued)

FOREIGN PATENT DOCUMENTS

WO   WO-2020055384 A1 *  3/2020  ............. G06Q 20/32

OTHER PUBLICATIONS

Notice of Allowance, U.S. Appl. No. 16/570,949, dated May 12, 2021, 13 pages.

*Primary Examiner* — Rebecca E Song
(74) *Attorney, Agent, or Firm* — Nicholson De Vos Webster & Elliott LLP

(57) ABSTRACT

Disclosed embodiments relate to distributed, crowd-sourced Internet of Things (IoT) discovery using Block Chain. In one example, a method includes scanning a network and generating a signature based on IoT device traits discovered, determining whether the signature is already in a verified or an unverified Block Chain, when the signature exists in the verified Block Chain, providing a verified entry including at least the IoT device type, otherwise, when the signature exists in the unverified Block Chain, providing an unverified entry including at least the IoT device type, incrementing a count, and promoting the unverified entry to the verified Block Chain when the count reaches a threshold, and otherwise, when the signature is in neither Block Chain, using the traits to guess the IoT device type, generating a new entry including the IoT device type, a location, and a timestamp, and storing the new entry in the unverified Block Chain.

20 Claims, 13 Drawing Sheets

Related U.S. Application Data

(60) Provisional application No. 62/731,742, filed on Sep. 14, 2018.

(56) References Cited

U.S. PATENT DOCUMENTS

| | | | |
|---|---|---|---|
| 2019/0355076 A1* | 11/2019 | Marcinkowski | G06Q 40/06 |
| 2020/0052880 A1* | 2/2020 | Bathen | H04L 9/14 |
| 2021/0120090 A1 | 4/2021 | Wang et al. | |
| 2021/0152365 A1* | 5/2021 | Nosseir | H04L 9/3239 |

* cited by examiner

500

Verified Device Descriptor 502

| Signature unique to the IoT device type generated during the network scan 504 | IoT Device Type 506 | Timestamp when the entry was created 508 | Device Location 510 |||
|---|---|---|---|---|---|
| | | | Device | X | Y |
| | | | 1323 | 27.0 | 129.1 |
| | | | 1445 | 37.1 | 130.5 |
| | | | 1552 | 38.2 | 133.3 |

Unverified Device Descriptor 512

| Signature unique to the IoT device type generated during network scan 514 | IoT Device Type 516 | Device Counter 518 | Timestamp when the entry was updated or created 520 | Device Location 522 |||
|---|---|---|---|---|---|---|
| | | | | Device | X | Y |
| | | | | 1321 | 26.0 | 139.1 |
| | | | | 122 | 38.1 | 150.5 |
| | | | | 326 | 35.2 | 123.3 |

FIG. 5

DISTRIBUTED, CROWDSOURCED INTERNET OF THINGS (IOT) DISCOVERY AND IDENTIFICATION USING BLOCK CHAIN

CROSS-REFERENCE TO RELATED APPLICATIONS

This patent application is a continuation of application Ser. No. 16/570,949, filed Sep. 13, 2019 (now U.S. Pat. No. 11,122,411 issued Sep. 14, 2021), which claims the benefit of U.S. Provisional Application No. 62/731,742, filed Sep. 14, 2018, which are hereby incorporated by reference.

FIELD OF INVENTION

The field of invention relates generally to the field of network-connected devices, and, more particularly, to distributed, crowdsourced Internet of Things (IoT) discovery and identification using Block Chain.

BACKGROUND

The present disclosure relates to networked devices, Internet of Things (IoT) devices, and more particularly to discovery and identification of IoT devices.

As described herein, the Internet of Things (IoT) is a network of physical objects, devices, or "things" that include electronics, software, and, sometimes, sensors. IoT devices described herein also include network connection capabilities used to collect and exchange data. The IoT devices' network interface, for example, allows objects to be sensed and controlled remotely across existing network infrastructure.

Some estimate that the IoT devices will number in the billions in the coming years. IoT device categories include but are not limited to: home automation IoT devices, industrial IoT devices, healthcare IoT devices, fitness IoT devices, development board IoT devices, and virtual reality (VR) IoT devices, to name a few.

As increasingly more IoT devices (e.g., servers, computers, phones, equipment, appliances, etc.) are connected to the network, one challenge is discovering and correctly identifying them, including creating and maintaining a unique signature and a device type for each IoT device.

BRIEF DESCRIPTION OF THE DRAWINGS

The present invention is illustrated by way of example and not limitation in the figures of the accompanying drawings, in which like references indicate similar elements and in which:

FIG. 5 is a format of a Block Chain entry, according to some embodiments;

DETAILED DESCRIPTION

Figure 1:
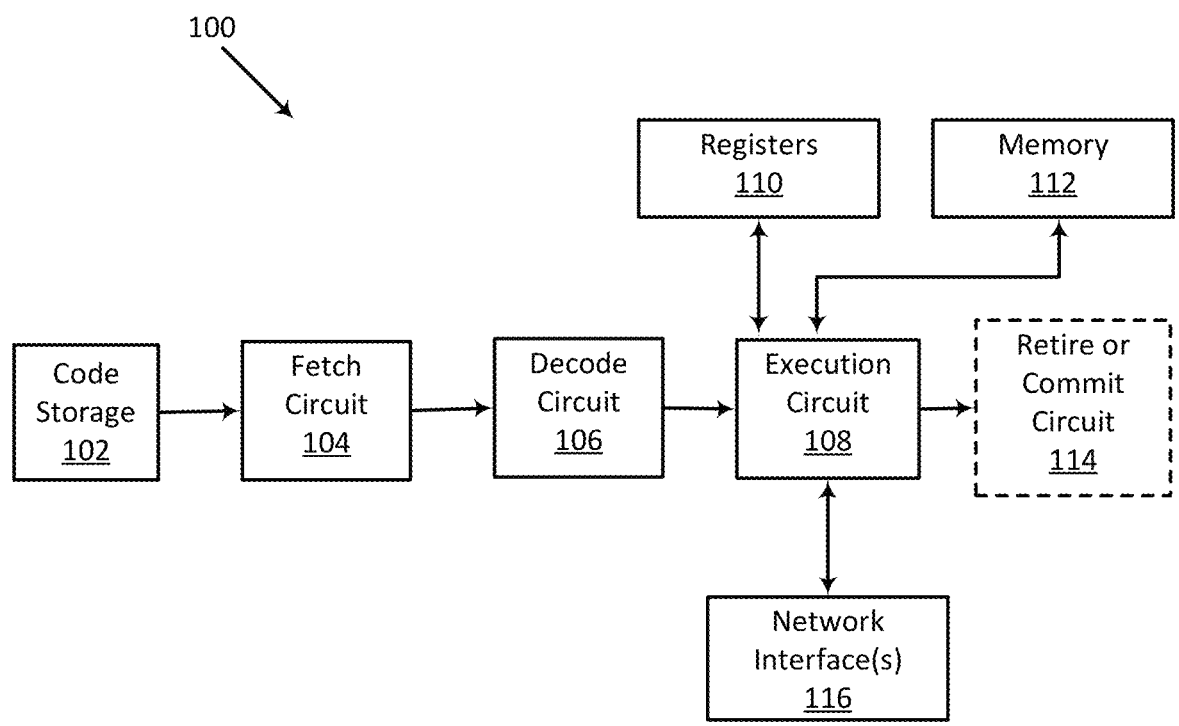
FIG. 1 is a block diagram illustrating processing components for use by an IoT device using a Block Chain, according to some embodiments.

In the following description, numerous specific details are set forth. However, it is understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described in connection with an embodiment, it is submitted that it is within the knowledge of one skilled in the art to affect such feature, structure, or characteristic in connection with other embodiments whether explicitly described.

Disclosed herein are methods, systems, and apparatus for identifying a device based on various network-based interrogation techniques, while also using crowdsourcing: multiple users' inputs are collected and analyzed to correctly identify a device and then store this device information in a Block Chain, which, in some embodiments, is a tamper-proof, distributed database containing entries describing IoT devices. In some embodiments, a configurable Block Chain access policy allows it to be accessed by any networked user that contributed to the database. In some embodiments, on the other hand, the configurable Block Chain access policy allows the database to be accessed by anyone, whether or not they contributed to the database.

According to some embodiments, the Block Chain is accessible on the network and serves as a tool to allow users to identify IoT devices. For example, a user of a computer in a small company computer network may access the Block Chain to identify and operate a locally available printer on the network. For example, a security analyst may access the Block Chain to identify and operate an available IoT security camera to which to connect. For example, a traveling salesman may access the Block Chain to locate an IoT-enabled washer/dryer to use for laundry. An exemplary flow performed by an IoT device to discover other devices on a network is further illustrated and described with respect to FIG. 7.

Unlike conventional IoT device databases that are proprietary, some embodiments of Block Chain systems and methods are universally accessible, according to a configurable access policy. In some embodiments, the configurable access policy allows free and open access to the Block Chain to all users who have contributed to verifying the Block Chain. In other embodiments, the configurable access policy allows users of a group, such as employees of a small company, to access that portion of the Block Chain that describes IoT devices local to that small company. In another embodiment, a discovery/identification/fingerprinting in the private network contributes signatures to the parent/internet Block Chain, but the private network user may opt to share the location and the signatures/device-types to only the local private Block Chain, which can be accessed by the employees of the network/company. For example: according to some embodiments, an employee can discover/ identify devices that get added to a private Block Chain, which fellow employees can access, but the public are not allowed access. This can help other employees locate the printer or IP cameras, etc. without sending this information to the public/internet Block Chain. However, in some embodiments, even if a user decides to keep the Block Chain private, the user still contributes to the signatures of all discovered devices to the public/internet Block Chain, thereby making the public Block Chain a super-set of all IoT device signatures.

In some embodiments, a local network of IoT devices, such as an internet cafe consisting of a plurality of network terminals, includes one device, such as a computer, that serves as the Block Chain node and implements the Block Chain methods disclosed herein. In some embodiments, the Block Chain node maintains a local copy of the Block Chain, allowing fast access thereto.

Some less advantageous approaches to identifying IoT devices develop proprietary databases by passively characteristics of network packets and network traffic, and gathering characteristics of an IoT device, including such characteristics as a MAC address (Media Access Control address), OS (Operating System), OS version, ports, network protocols, and source and destination URLs (Uniform Resource Locators). But such approaches do not provide the benefits of disclosed embodiments. Namely, such approaches at least lack crowdsourced verification and thus often yield device information that is incorrect or incomplete. Such alternative approaches also typically rely on proprietary databases, made available to only their customers. Such alternative approaches therefore lack the benefits of disclosed embodiments of allowing the crowdsourced Block Chain to be ubiquitously shared according to a configurable sharing policy.

Disclosed embodiments, then, by taking advantage of crowdsourcing to verify the entries of a ubiquitous Block Chain, offer several advantages. First, for example, Block Chain entries provide improved accuracy and reliability than conventional approaches insofar as Block Chain entries are verified and become trusted by multiple user inputs (i.e. crowdsourced). A verified Block Chain contains multiple verified entries. In some embodiments, the Block Chain entry is only verified and committed when a few user inputs beyond a configurable agreement threshold are amassed. To implement such an approach, some embodiments maintain a verified or trusted Block Chain and an untrusted Block Chain consisting of entries waiting to be confirmed by receiving more than the agreement threshold number of crowdsourced inputs in concordance. In some embodiments, a centralized Block Chain server receives inputs from multiple Block Chain users in the field and uses those inputs to update entries in a centralized Block Chain. In some such embodiments, the Block Chain server maintains a master, verified, released version of the Block Chain, and a training Block Chain that needs more user inputs before becoming verified.

Another advantage of systems, devices, and methods implementing the disclosed Block Chain is that the Block Chain is universally distributed, and according to some sharing policies, is freely available to every user who contributed to verifying the Block Chain entries. In some embodiments, the Block Chain allows users access only to specific device entries to which they have contributed, rather than allowing users to freely access all devices. In another embodiment there can be a completely separate, local private Block Chain that is accessible to the private network only that has contributed/created it.

Another advantage of systems, devices, and methods implemented according to the disclosed Block Chain is that distributed databases are expected to be smaller, cheaper, and faster to access. In some embodiments, each of the nodes equipped with the disclosed Block Chain maintains a small, fast, local cache of its most commonly used Block Chain entries.

Device Profiling and Block Chain

In some embodiments, networked IoT devices are profiled by monitoring and analyzing network data packets generated by each device. In such embodiments, networked devices are profiled by analyzing packets to determine not only various attributes such as MAC address, operating system, data communication, etc. But such embodiments also augment the networked device profiles by analyzing attributes not analyzed by conventional device profiling approaches. For example, some such embodiments further evaluate DNS (Domain Name System) logs to determine all domains visited by IoT device. For another example, some such embodiments further include deep packet inspection of captured packets, to evaluate attributes such as TCP (Transmission Control Protocol) attributes. Some embodiments further analyze logs stored by firewalls and routers. Some embodiments further analyze DHCP (Dynamic Host Configuration Protocol) logs, etc.

According to some embodiments, once a device profile is generated it is added to a collection of device descriptors in a Block Chain. According to some embodiments, a Block Chain is a tamper-proof, distributed database containing entries describing IoT devices. In some embodiments, an unauthorized attempt to alter the Block Chain collection is prevented. Using this type of database to store known IoT signatures can allow the database to serve as a distributed entity, where users can look at the database and can add new entries to the database.

Universally Available, Freely Distributed

The disclosed Block Chain improves usability of the discovered Block Chain device descriptors, be they confirmed or unconfirmed, by avoiding using a proprietary dataset only available to customers. Rather, access to the Block Chain collection of device descriptors is governed by a configurable sharing policy. In some embodiments, the sharing policy allows universal access to anybody. In other embodiments, the sharing policy allows unfettered access only to members of a select group, for example, employees of a company, or students of a university, or patrons of a restaurant through the private local Block Chains for these entities.

Preventing Malicious Updates

The integrity and security of the Block Chain collection of device descriptors is preserved in some embodiments by limiting Block Chain updates to those with administrative privileges. In some embodiments, multiple geographically-dispersed Block Chain nodes each has a copy of the trusted device Block Chain, which is sometimes referred to as a verified Block Chain. Periodically, for example once per hour, or once per day, or once per week, the trusted device Block Chains of multiple Block Chain nodes are compared, and any anomalous instances of the trusted Block Chain collection are replaced. In some embodiments, a single, central authority monitors the multiple, dispersed instances of the Block Chain collection, while, in other embodiments, the security and integrity of the Block Chain collection is preserved by multiple Block Chain nodes working together. In some embodiments, an entire instance of a Block Chain collection on a Block Chain node is discarded and replaced when an attempt to maliciously update the Block Chain collection on that node is detected.

Democratic Process

In some embodiments, new entries in the Block Chain collection are only allowed through a democratic process; i.e., updates are only allowed if a majority, or a super majority, or even an unanimity of multiple additional instances of Block Chains (in multiple Block Chain nodes) agree on the update. Conventional approaches to device discovery do not offer such a benefit. In some embodiments, the democratic process is implemented using a counter to keep track of how many times a same device descriptor has been seen by different Block Chain nodes in the network of Block Chain nodes, and updates to the Block Chain collection are only allowed when that count surpasses a threshold. Once the threshold is surpassed the device descriptor entry from an unverified Block Chain is moved to a verified Block Chain.

Network of Block Chain Nodes

In some embodiments, each machine—laptop/server/router/etc. that implements disclosed Block Chain methods and runs a network scan to discover and identify devices in its network becomes and is considered part of a network of Block Chain nodes.

Verified/Unverified Block Chains

Block Chain Storage

In some embodiments, the trusted and untrusted collections of device descriptors are stored in memory of each node in the network of Block Chain nodes. Some networked Block Chain nodes are computing devices with an execution core and a modest amount of memory. In some embodiments, the computing devices with a modest amount of memory use the memory as a cache to store a few most recently acquired IoT device descriptors, one or more of the acquired descriptor having evicted and replaced an IoT device descriptor previously stored in the cache according to a cache replacement policy, such as least recently used.

In other embodiments, each Block Chain node in the network of Block Chain nodes includes a memory hierarchy, including for example a level 1 cache (L1), a level 2 cache (L2), a level 3 cache (L3 or LLC), and a main memory.

In some embodiments, each of multiple Block Chain nodes communicates directly with one or more other Block Chain nodes, while in other embodiments, each of multiple Block Chain nodes communicates with a centralized Block Chain server.

In some embodiments, a verified Block Chain is immutable, requiring administrative privileges in order be modified, and wherein dynamically changing fields of the verified entry, such as the location, are not included in the providing. In some embodiments, a verified Block Chain is immutable, and modifying the verified block chain is not allowed by any privileges.

Figure 3A:
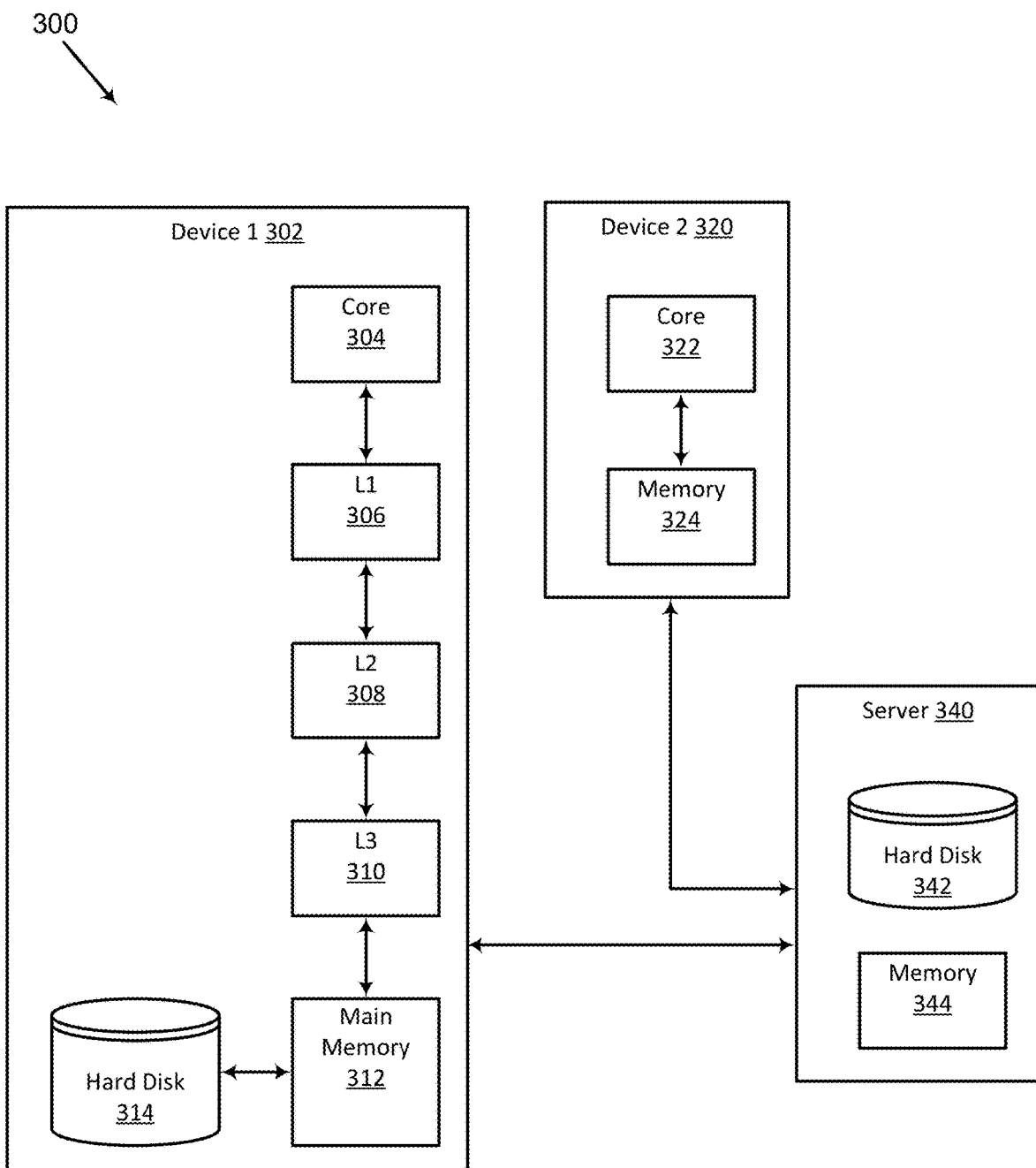
FIG. 3A is a block diagram illustrating a memory hierarchy used between multiple Block Chain nodes and a Block Chain server, according to some embodiments.
Figure 3B:
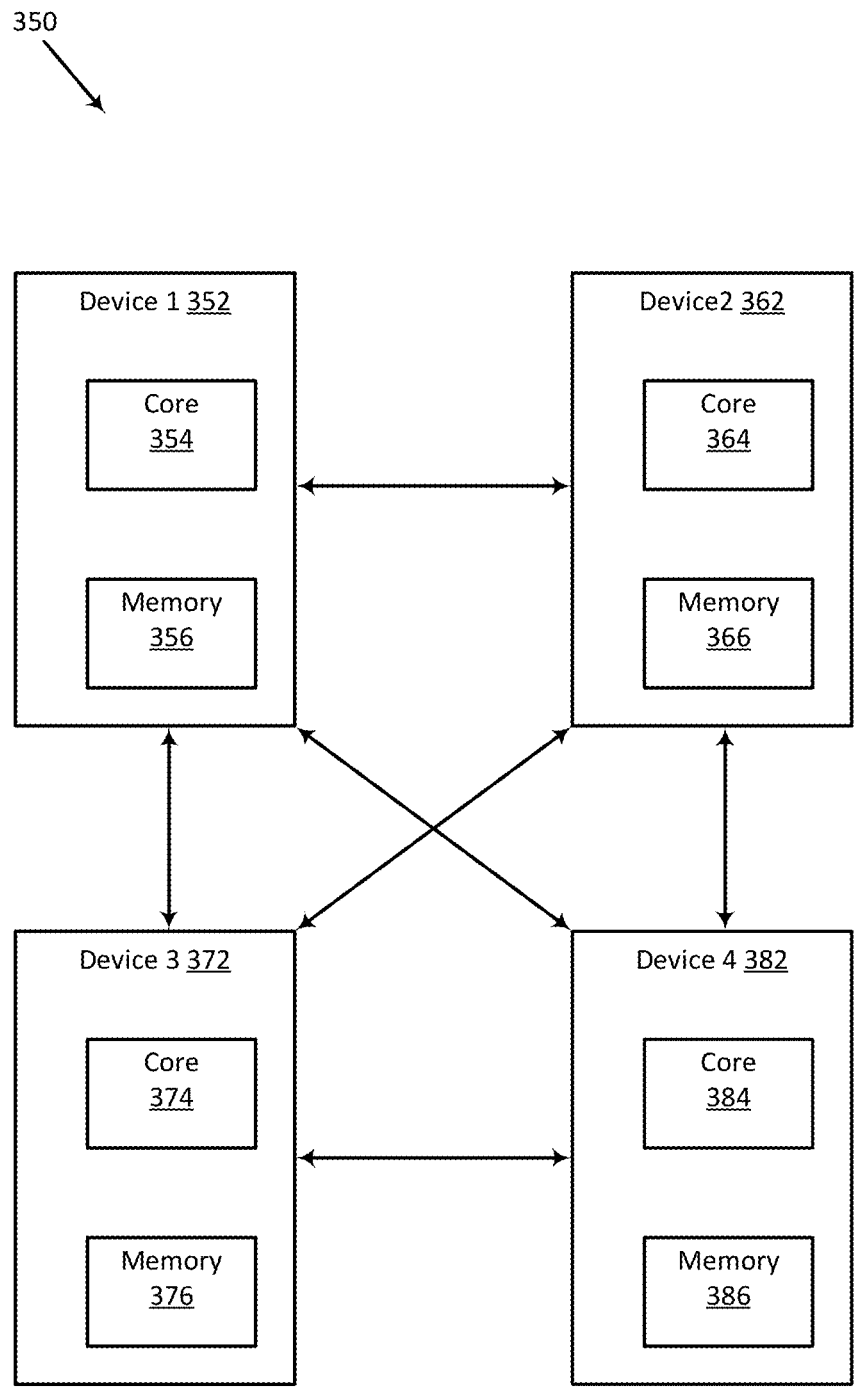
FIG. 3B is a block diagram illustrating a memory hierarchy used among multiple Block Chain nodes, according to some embodiments.

Block Chain storage and the interconnections among Block Chain nodes are further illustrated and described with respect to FIGS. 3A-3B.

Block Chain Synchronization

In some embodiments, the trusted and untrusted collections of device descriptors are synchronized as soon as any one of the nodes performs an update. In other embodiments, each of the Block Chain nodes synchronizes its Block Chain collections by directly communicating the update to other Block Chain nodes according to a sharing policy. The sharing policy can call for updates to be immediately shared with other nodes, or share after some delay or number of updates, or any combination thereof. In some embodiments, each of the Block Chain nodes shares its updates to the collection of device descriptors with a centralized Block Chain server, who decides whether and when to synchronize other Block Chain nodes with the update. Synchronization of Block Chain collections among Block Chain nodes and between Block Chain nodes and a Block Chain server are further illustrated and described with respect to FIGS. 4A-4B.

Fingerprinting Process

The software can start scanning/fingerprinting the network/devices using various methods—including but not limited to:

P0f, which is a tool that utilizes an array of sophisticated, purely passive traffic fingerprinting mechanisms to identify the players behind any incidental TCP/IP communications (often as little as a single normal SYN).

Nmap ("Network Mapper") is an open-source utility for network discovery and security auditing. The Nmap utility is open-source software.

Raw Packet Capture can be performed using tools like TShark and WireShark®, which are tools that capture raw packet data from a live network, or read packets from a previously saved capture file, either printing a decoded form of those packets to the standard output or writing the packets to a file.

Solution Workflow

In some embodiments, computer-readable instructions are stored on a non-transitory computer readable medium, the instructions, when executed by a processor, to cause the processor to perform methods as described and claimed herein. In some embodiments, those computer-readable instructions are made available for download from a web site, allowing, any user to download and install the software instructions. The software is freely available for any user to download and install on any type of hardware.

FIG. 1 is a block diagram illustrating processing components for use by a Block Chain node (computer, router, server, Raspberry Pi®, phone, etc.) using a Block Chain, according to some embodiments. As shown, computing system 100 includes code storage 102, fetch circuit 104, decode circuit 106, execution circuit 108, registers 110, and memory 112. Some embodiments further include retire or commit circuit 114, which is optional, as indicated by its dashed border, insofar as it may occur at a different stage, or not at all. Computing system 100 also includes network interface(s) 116.

Figure 2A:
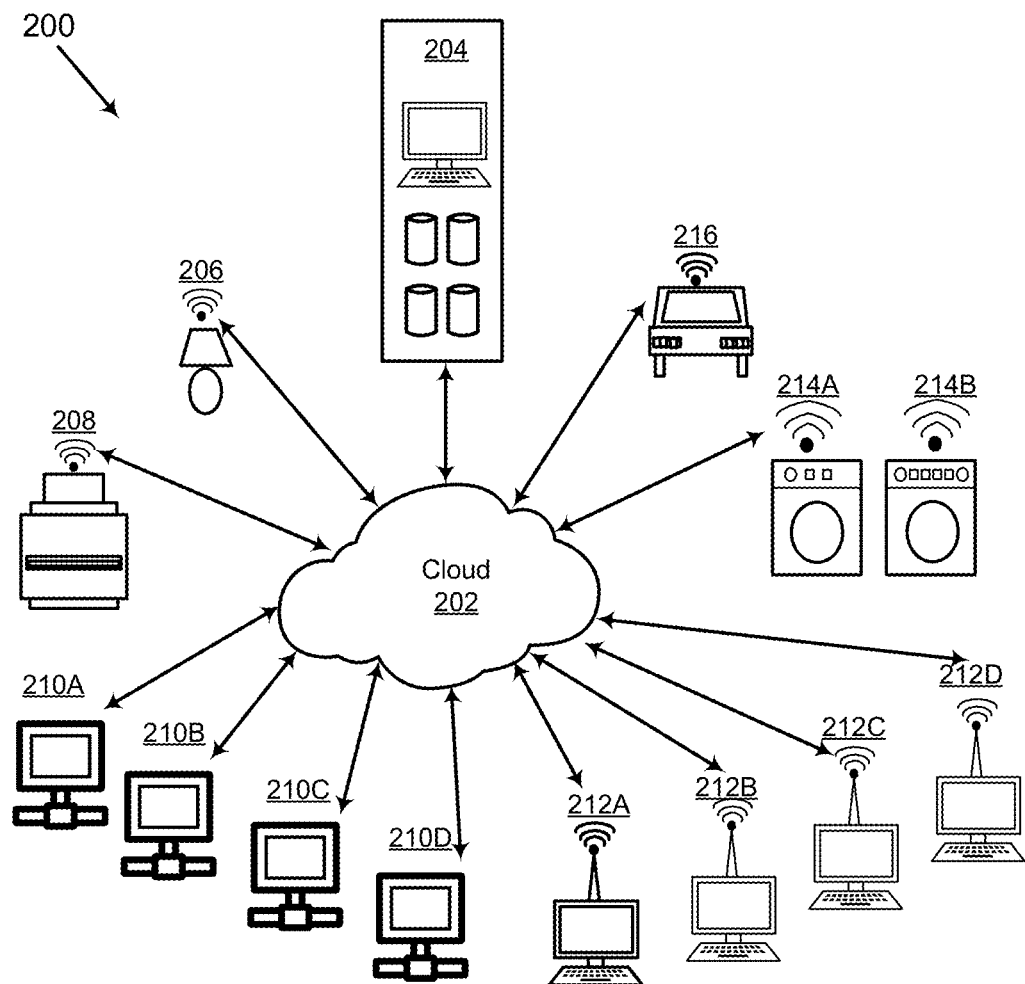
FIG. 2A is a block diagram illustrating a network of IoT devices associated with a Block Chain, according to some embodiments.

FIG. 2A is a block diagram illustrating a network of IoT devices associated with a Block Chain, according to some embodiments. As shown, IoT network 200 includes cloud 202, a server 204, and a variety of IoT devices, including lamp 206, printer 208, internet terminals 210A, 210B, 210C, and 210D, wireless terminals 212A, 212B, 212C, and 212D, washer and dryer 214A and 214B, and automobile 216. It should be noted that the IoT devices can be a mix of sensors without CPUs and regular computing devices having CPUs and memory.

Figure 2B:
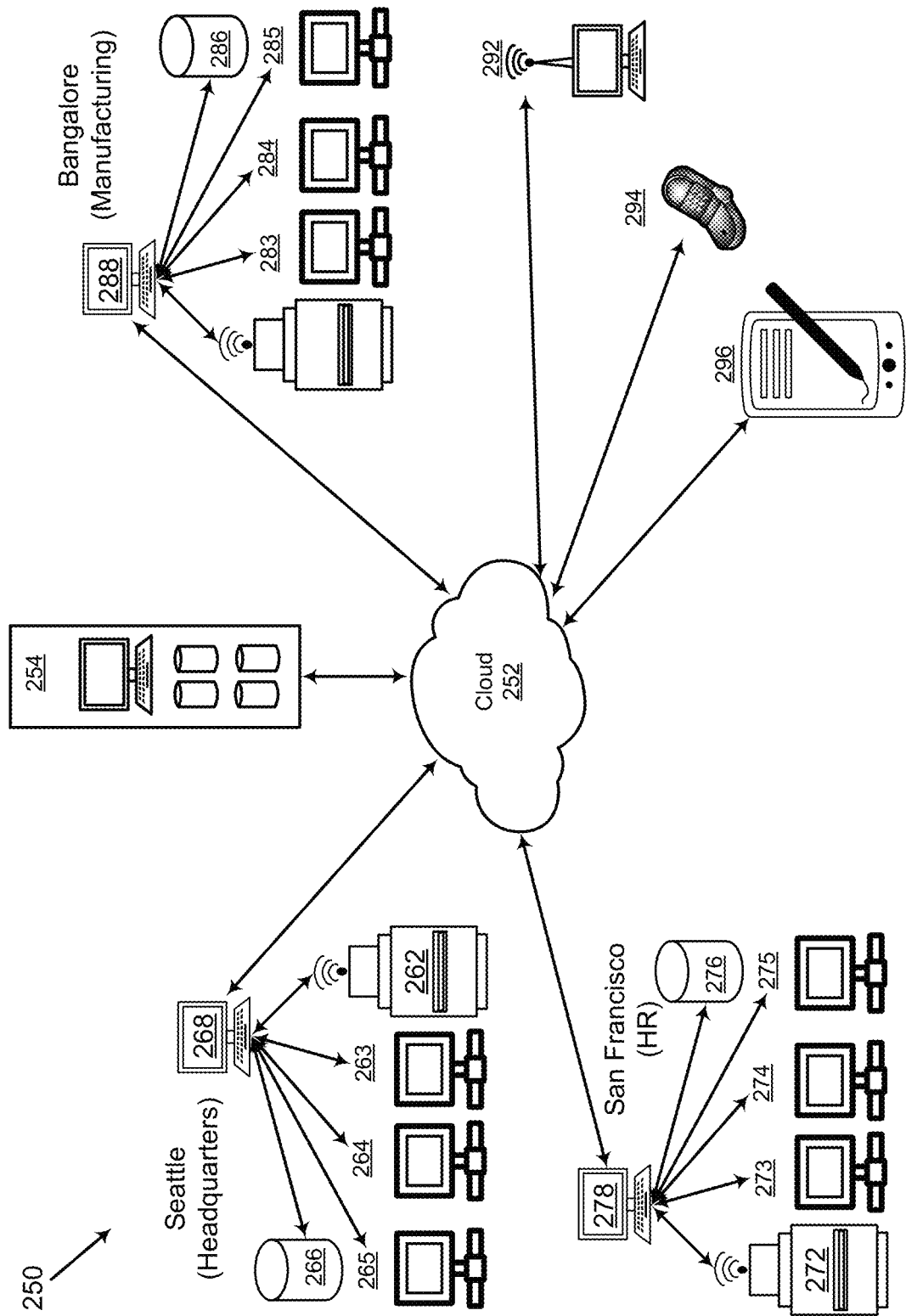
FIG. 2B is a block diagram illustrating a hierarchical network of IoT devices associated with one or more Block Chains, according to some embodiments.

FIG. 2B is a block diagram illustrating a hierarchical network of IoT devices associated with one or more Block Chains, according to some embodiments. As shown, network 250 includes a corporate network having multiple, geographically dispersed departments and locations. A central server 254 includes a processing device and memory, and is an example of server 340 of FIG. 3A. The Seattle location is the corporate headquarters, and includes IoT devices 262 (a printer), 263 (an employee workstation), 264 (an employee workstation), 265 (an employee workstation), 266 (a datacenter), and 268 (an edge device that connects the Seattle network to the cloud). The San Francisco location is the corporate human resources department, and includes IoT devices 272 (a printer), 273 (an employee workstation), 274 (an employee workstation), 275 (an employee workstation), 276 (a datacenter), and 278 (an edge device that connects the San Francisco network to the cloud). The Bangalore location is the corporate manufacturing department, and includes IoT devices 282 (a printer), 283 (an employee workstation), 284 (an employee workstation), 285 (an employee workstation), 286 (a datacenter), and 288 (an edge device that connects the Bangalore network to the cloud). Examples of edge devices include routers, routing switches, integrated access devices (IADs), multiplexers, and a variety of metropolitan area network (MAN) and wide area network (WAN) access devices.

The multiple corporate locations communicate via a cloud 252, which also connects to devices 296 (a personal digital assistant), 294 (a mobile phone), and 292 (a remote workstation).

Many different Block Chains, including hierarchical Block Chains, can be created to describe the IoT devices in network 250. As mentioned above, Block Chains can be local to a network or they can be company-wide or cover a geographic region, like city-wide or country-wide Block Chains. For example, each department in the corporation can have a Block Chain, and employees assigned to the department can have rights to access the Block Chain. As another example, each geographic location can have a Block Chain to describe IoT devices within that location. For example, a San Francisco Block Chain can identify IoT devices in San Francisco. The Block Chains can also be defined at a higher granularity: a different Block Chain can be created for different San Francisco neighborhoods, or streets. And, of course, there can be a global Block Chain. Each of the different Block Chains can be controlled by different access rights.

As mentioned above, Block Chains, according to some embodiments, are hierarchical. For example, a super Block Chain can sit on top of other, lower-level Block Chains. Higher-level Block Chains can incorporate lower-level Block Chains beneath them in levels of hierarchy.

In operation, users have the option to contribute to the public Block Chain or keep the discovered Block Chain information to the local network.

In some embodiments, a Block Chain can be dynamically generated and provided upon request. For example, a Block Chain can be dynamically generated and returned listing all IoT devices located within a threshold distance to a device location, such as a current location, a home location, a work location, or other specified location. Or, a Block Chain can be dynamically generated and provided upon request, for example returning all IoT devices of a particular type to the user. For example, the user may request a Block Chain of all printers nearby.

In some embodiments, a Block Chain returned to a user excludes devices to which the user does not have access rights.

FIG. 3A is a block diagram illustrating a memory hierarchy used between multiple Block Chain nodes and a Block Chain server, according to some embodiments. As shown, system 300 includes device 1 302, which is a computer including a core 304, three levels of cache memory, L1 306, L2 308, and L3 310, and main memory 312, which in some embodiments is coupled to hard disk 314. System 300 also includes device 2 320, which is a computing device including a core 322 and memory 324. In some embodiments, core 304 includes a non-volatile memory 316, such as a flash-memory or ROM, that can store and maintain Block Chain details despite loss of power. In some embodiments, core 304 includes a register file 318, which can be used to store Block Chain details for quick and repeated access. Non-volatile memory 316 and register file 318 are optional, as indicated by their dashed borders.

FIG. 3A also shows an embodiment of a Block Chain server 340, which includes hard disk 342, memory 344, and, in some embodiments, non-volatile memory 346, all of which can be used to store Block Chains. In some embodiments, the Block Chain server 340 maintains a super Block Chain that can be publicly accessible.

Figure 6A:
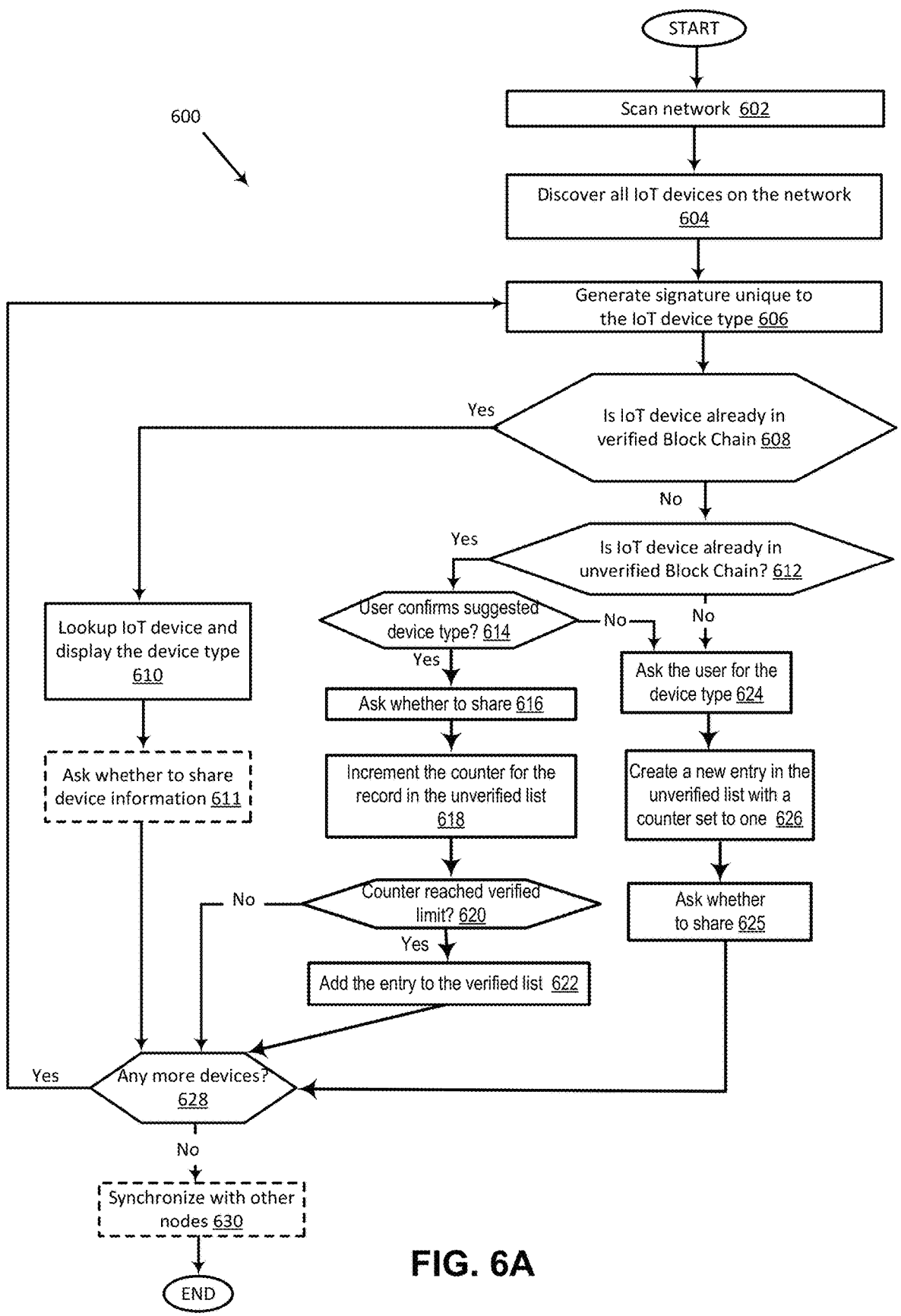
FIG. 6A is a flow diagram illustrating a process to be executed by a computing device to scan a network of devices to build a Block Chain, according to some embodiments.
Figure 6B:
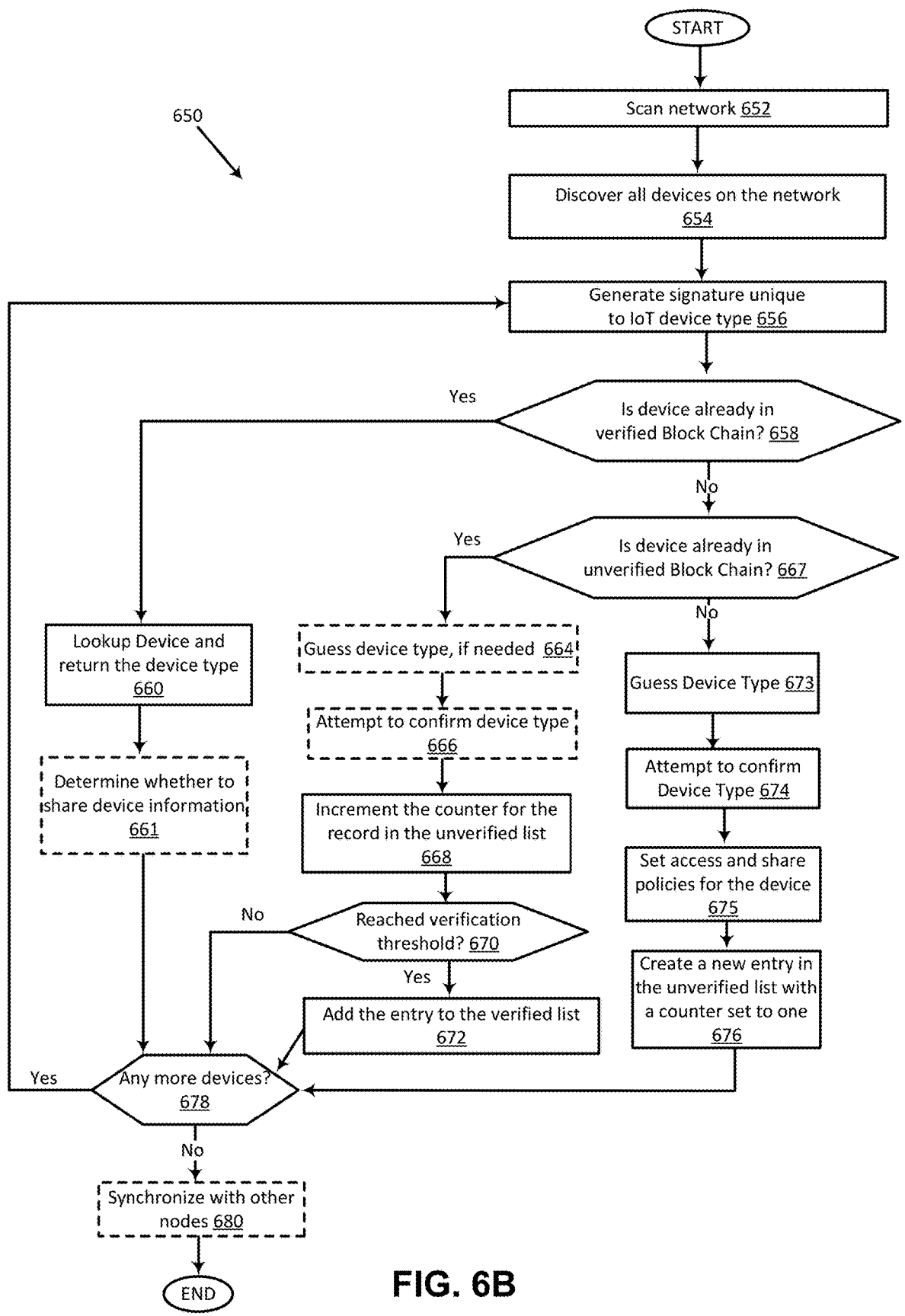
FIG. 6B is a flow diagram illustrating a process to be executed by a computing device to scan a network of devices to build a Block Chain, according to some embodiments.

FIG. 3B is a block diagram illustrating a memory hierarchy used among multiple Block Chain nodes, according to some embodiments. As shown, system 350 includes four interconnected devices, device 1 352, which contains core 354 and memory 356, device 2 362, which contains core 364 and memory 366, device 3 372, which contains core 374 and memory 376, and device 4 382, which contains core 384 and memory 386. A Block Chain according to disclosed embodiments describes the devices in the current subdomain. In other embodiments, the Block Chain describes devices one level of hierarchy higher. For example, with reference to FIG. 2B, the Block Chain can describe IoT devices in a particular department of a particular location of a company. Similarly, the Block Chain can describe IoT devices in a particular location of a company. According to some embodiments, two versions of a Block Chain are maintained, a verified Block Chain and an unverified Block Chain. FIGS. 6A-6B, below, describe the use and updating of the verified and unverified Block Chain.

Figure 4A:
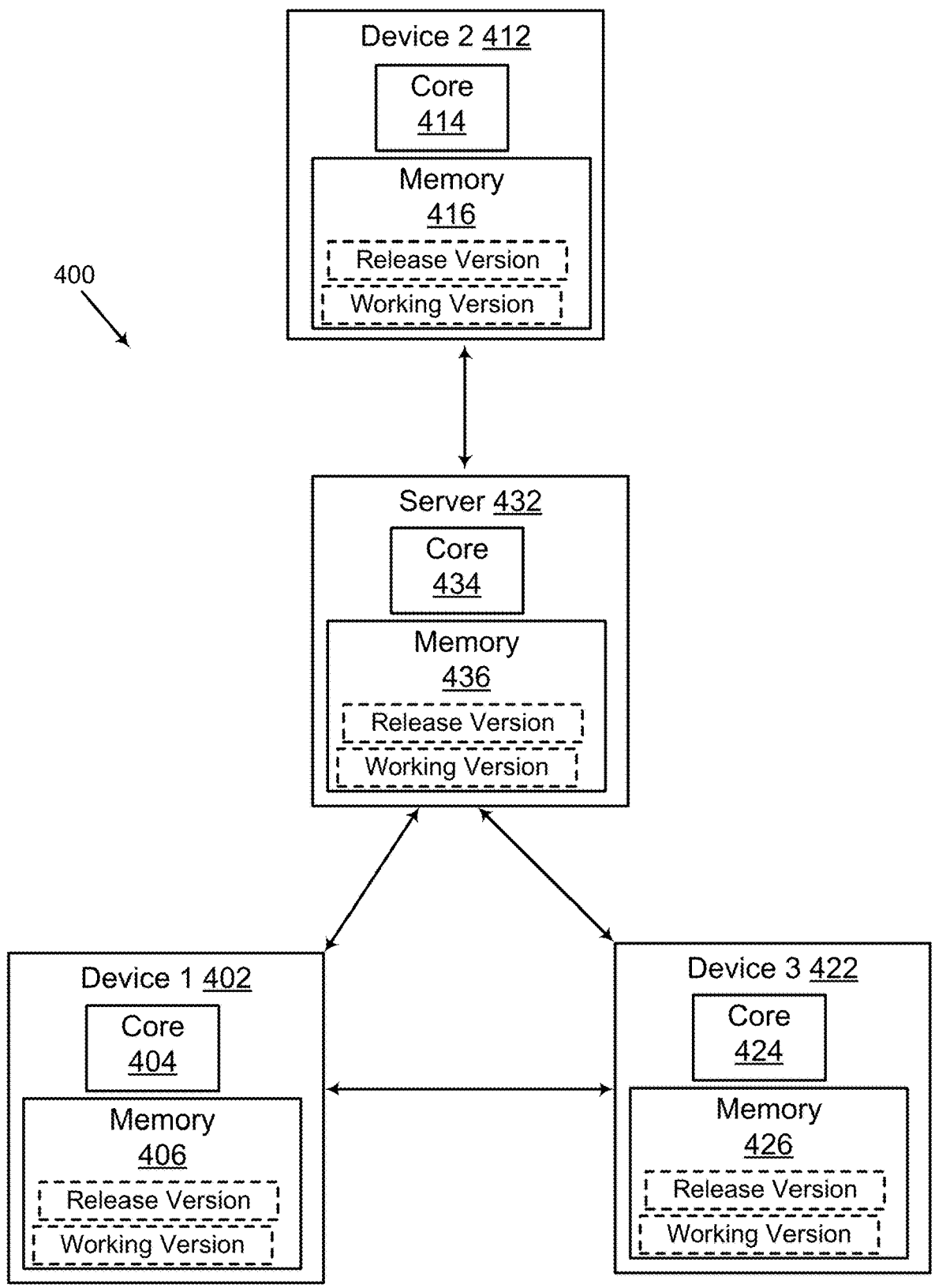
FIG. 4A is a block diagram illustrating a Block Chain revision control system among multiple Block Chain nodes and a Block Chain server, according to some embodiments.

FIG. 4A is a block diagram illustrating a Block Chain revision control system among multiple Block Chain nodes and a central server, according to some embodiments. As shown, system 400 includes three devices 402, 412, and 422, coupled to a centralized server 432. More particularly, device 1 402 includes core 404 and memory 406, device 2 412 includes core 414 and memory 416, and device 3 422 includes core 424 and memory 426. Server 432 also includes a core 434 and memory 436.

As shown, the memory 406, 426, and 436 in each of devices 1, 2, and 3, respectively, includes an optional release version and working version of the Block Chain. The working and release versions are optional, as indicated by their dashed borders, insofar as they might be omitted in some embodiments. When omitted, each node synchronizes its Block Chain updates immediately with other nodes. But when a device memory includes both versions, most regular updates are performed on the working version, and occasionally, working version is converted into the release version and shared with other nodes.

Figure 4B:
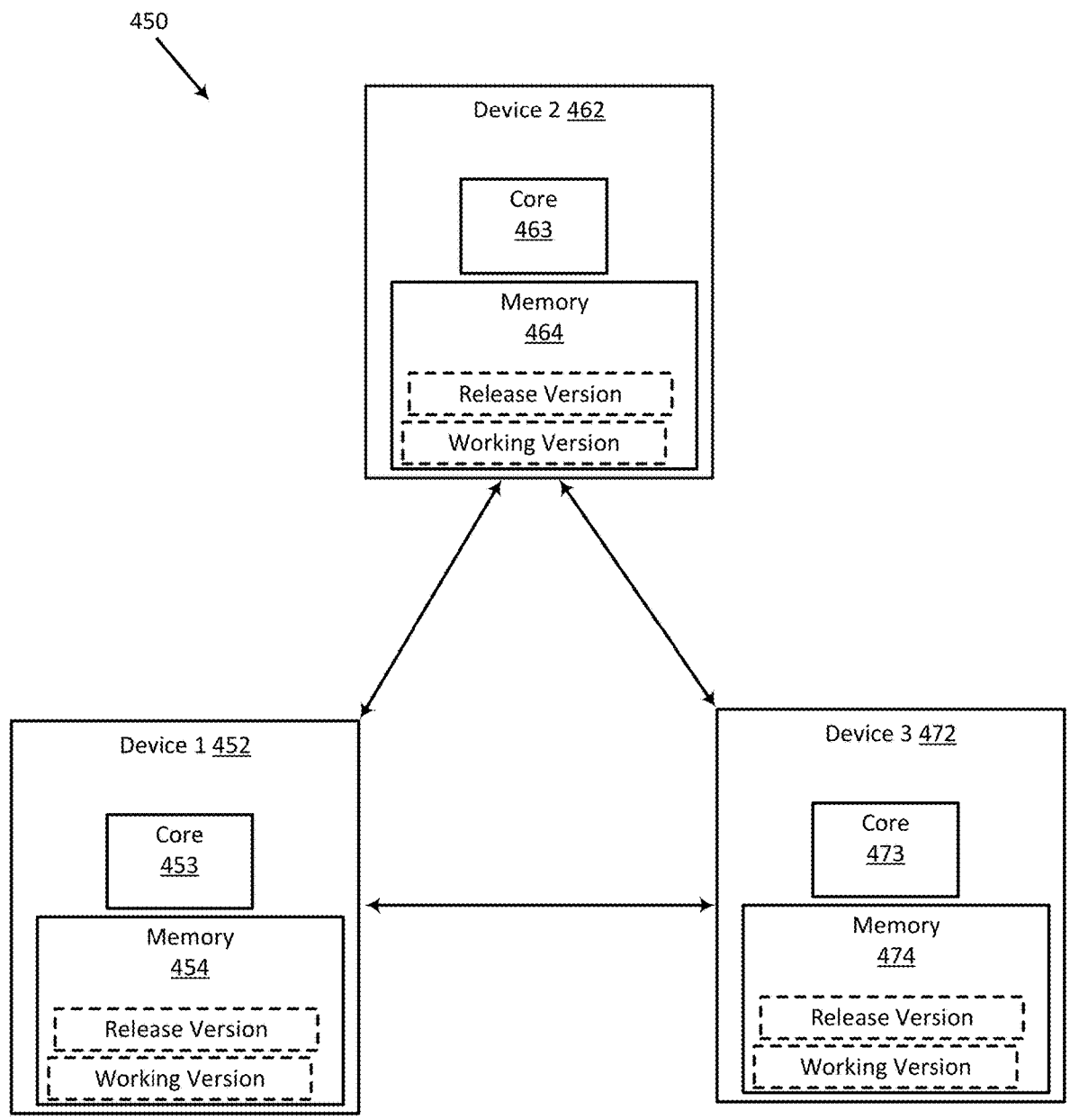
FIG. 4B is a block diagram illustrating a Block Chain revision control system among multiple Block Chain nodes and a Block Chain server, according to some embodiments.

FIG. 4B is a block diagram illustrating a Block Chain revision control system among multiple Block Chain nodes and a Block Chain server, according to some embodiments. As shown, system 450 includes three interconnected devices, device 1 452, device 2 462, and device 3 472. More particularly, device 1 452 includes core 453 and memory 454, device 2 462 includes core 463 and memory 464, and device 3 472 includes core 473 and memory 474.

As shown, the memory 454, 464, and 474 in each of devices 1, 2, and 3, respectively, includes an optional release version and working version of the Block Chain. The working and release versions are optional, as indicated by their dashed borders, insofar as they might be omitted in some embodiments. When omitted, each node synchronizes its Block Chain updates immediately with other nodes. But when a device memory includes both versions, most regular updates are performed on the working version, and occasionally, working version is converted into the release version and shared with other nodes.

Figure 4C:
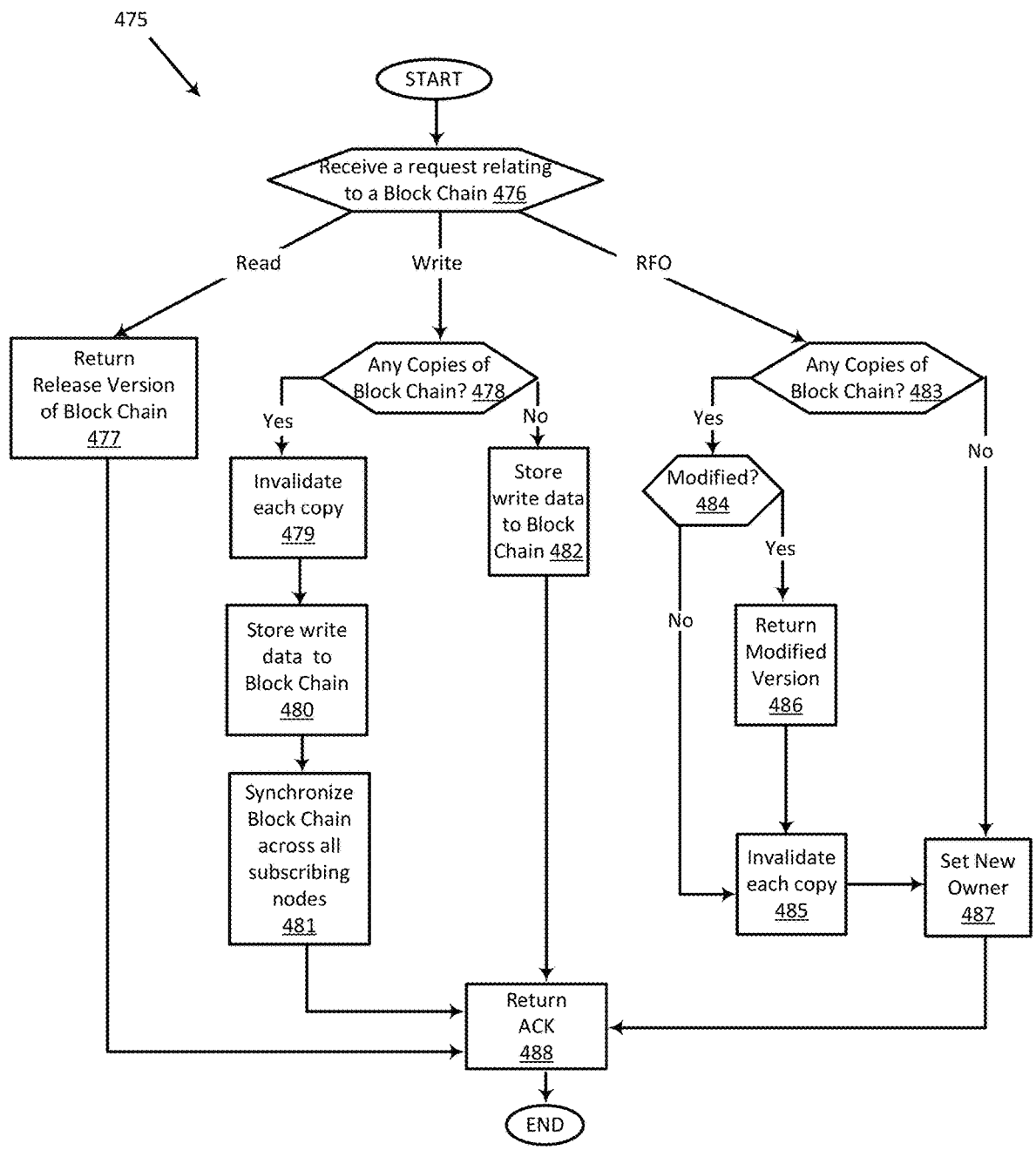
FIG. 4C is a block flow diagram illustrating an embodiment of a process of updating and finalizing a working version of a Block Chain, and then promoting it to a release version, according to some embodiments.

FIG. 4C is a block flow diagram illustrating an embodiment of a process of updating and finalizing a working version of a Block Chain, and then promoting it to a release version. As shown, flow 475 begins at operation 476 by a computing device performing disclosed methods receives a request relating to a Block Chain. If the request is a READ, the computing device at 477 returns a release version of the Block Chain, and then proceeds to return an acknowledgement at 488.

If the request is a WRITE, the computing device at 478 determines whether any copies of the Block Chain exist in the system. If so, the computing device at 479 invalidates each copy, at 480 stores write data to the Block Chain, and at 481 synchronizes the Block Chain across all subscribing nodes. The computing device then proceeds to return an acknowledgement at 488. On the other hand, if the computing device determines at 478 that no sharing copies of the Block Chain exist, and then at 482 the computing devices stores write data to the Block Chain. The computing device then proceeds to return an acknowledgement at 488.

If the request is a RFO (Request for Ownership), the computing device at 483 determines whether any copies of the Block Chain exist in the system. If not, the computing device at 487 sets a new owner for the Block Chain. But If it is determined at 483 that copies do exist, the computing device at 484 determines whether any modified version of the Block Chain exists in the system. If not, the computing device invalidates each copy of the Block Chain at 485. But If a modified copy does exist, the computing device at 486 returns the modified version, and then invalidates each copy of the Block Chain at 485. If not, the computing device invalidates each copy of the Block Chain at 485, and sets the new owner for the Block Chain at 487.

FIG. 5 is a format of a Block Chain entry, according to some embodiments. As shown Block Chain entry formats 500 include a verified device descriptor 502, which includes a signature unique to the IoT device type 504 generated during a network scan, an IoT device type 506, a timestamp 508 when the entry was created, and. Unverified device descriptor 512 includes a signature unique to the IoT device type 514 generated during a network scan, an IoT device type 516, a device counter 518, a timestamp 520 when the entry was updated or created, and device physical locations 522.

FIG. 6A is a flow diagram illustrating a process to be executed by a computing device to scan a network of IoT devices to build a Block Chain, according to some embodiments. In operation, the computing device is to perform flow 600, either according to instructions loaded form a non-transitory computer readable medium (e.g., flash memory, ROM, DVD), or implemented directly in hardware. As shown, after starting, the computing device at 602 is to scan a network. At 604 the computing device is to discover all IoT devices on the network. A flow for scanning and discovering IoT devices according to disclosed embodiments is illustrated and described with respect to FIG. 7.

At 606 the computing device is to generate a signature unique to the device type of the discovered IoT device. Disclosed embodiments include different ways of generating the unique signature.

For example, the computing device can generate the unique signature based on the IP address of the IoT device. In some embodiments, the unique signature can also (or instead) reflect the MAC address of a network interface of the IoT device. In some embodiments, the unique signature can reflect a timestamp of when the IoT device is discovered, the timestamp to be added to the unverified Block Chain at operation 626. In some embodiments, the unique signature can reflect a location of the IoT device when the IoT device is discovered, the location to be added to the unverified Block Chain at operation 626. In some embodiments the unique device type signature is generated based on a combination of part of the MAC address, the OS, the OS version, the ports used, the protocols involved, and source and destination URLs. In some embodiments, the location can be used when dynamically generating a Block Chain of IoT devices located within a threshold distance of a location, as described above with respect to FIG. 2B.

At 608 the computing device is to determine, for example by using the unique signature as an index, whether the IoT device is already in the verified Block Chain. If so, the computing device at 610 is to lookup the IoT device and display the device type. In some embodiments, the computing device at 611, is to ask if the user wants to share the physical location/coordinates of the device. Several different ways to acquire user input are described below with respect to operation 614. The flow then proceeds to 628.

But, if the computing device at 608 determines that the device is not already in the verified Block Chain, the computing device is to determine at 612 whether the device is in the unverified Block Chain. If so, the computing device at 614 is to suggest a device type, for example as listed for the device in the unverified Block Chain, and ask for confirmation.

There are several different ways the computing device can go about acquiring user input, including for example, asking for confirmation at 614. For example, the computing device can pose a question to the user on a user interface of a device, asking the user to confirm a suggested device type. In other embodiments, the computing device, again via a user interface, can offer a list of choices from which the user is asked to pick. In other embodiments, the computing device is to offer a text box in which the user is to type or describe the device type. In each example, the computing device can set a timeout timer in which a response is to be received from the user, or else a default selection or no selection is entered. In yet other embodiments, the computing device is to refer to a configuration, created for example when first powering on or initializing the device, that sets forth a list of devices from which to choose, or sets forth a default device type to select. If the user at 614 confirms the device type, the computing device at 616 is to ask whether the user wants to share the physical location (e.g., GPS coordinates) of the device. The computing device at 616 can use the same mechanisms as in step 614 of obtaining user input. In some embodiments, the computing device is to make a default choice of whether to share, for example as set forth in a configuration created earlier, without requiring user input. In some embodiments, when the user does not accept any of the suggested device types and provides a completely new device type, a new entry is created on the unverified Block Chain with a counter set to 1.

At 618, since the device type was confirmed at 614, the computing device is to increment the counter for the record in the unverified Block Chain. At 620, the computing device is to determine whether the counter has reached a verified limit, and if so, at 622, the computing device is to add the entry to the verified Block Chain, which represents one of the ways the unverified record moves to the verified Block Chain. But if the verified limit has not been reached, the flow proceeds to operation 628.

If, however, the user at 614 does not confirm the suggested device type, the computing device proceeds to operation 624 to ask the user, similarly to operation 614, for the device type and at 625, similarly to operation 616, to ask if the user wants to share the physical location (e.g. GPS coordinates) of the device. At 626, the computing device is to create a new entry in the unverified Block Chain with a counter set to one. The flow then proceeds to 628.

Returning now to the determination made at 612, if the device is not in the unverified Block Chain, the computing device at 624, using the same user-input options as used at operation 614, is to ask the user for the device type and at 625, similarly to operation 616, is to ask if the user wants to share the physical location/coordinates of the device, and at 626 is to create a new entry in the unverified Block Chain with a counter set to one. The flow then proceeds to 628.

At 628, the computing device is to determine whether any more devices remain to analyze, and if so, to return to 606 to start executing the algorithm on the next device, and, if not, the flow proceeds to operation 630.

In some embodiments, before ending, the computing device synchronizes its verified and unverified Block Chains with a plurality of additional, geographically-dispersed instances of each. For example. the computing device at 630 synchronizes both versions of its Block Chain—verified and unverified—if it is an appropriate time to synchronize, with one or more other nodes at the same or different levels of hierarchy. In some embodiments, after synchronizing the Block Chains of a first and second node, the computing device is to generate and subsequently use a new Block Chain that is the union of the two Block Chains. In other embodiments, after synchronizing the Block Chains, be they verified or unverified, of a first and second node, the computing device is to generate and subsequently use a new Block Chain that is the intersection of the two Block Chains. In some embodiments, when synchronizing unverified Block Chains in a first and a second node with respect to an IoT device, the unverified Block Chain having a higher count is selected.

The Block Chains syncing process can include many checks and verifications. For example, if two independent nodes have incremented counters for a same device then during synch these two entries are merged with final counter becoming the sum of the two counters.

In some embodiments, if there is a conflict between the two version of verified Block Chains, then the Block Chain with the earliest timestamp wins.

Upon ending the flow for each IoT device in the network, if the verified Block Chain has the unique signature, then the device type for that unique signature is displayed to the end user. As described above, if the unique signature is not in the verified Block Chain, then it is checked against the unverified Block Chain at operation 612. If the signature is in the unverified Block Chain, then the computing device at 614 asks the user to confirm the suggested device type derived from the unverified Block Chain entry. Or, the user can provide a new device type.

FIG. 6B is a flow diagram illustrating a process to be executed by a computing device to scan a network of IoT devices to build a Block Chain, according to some embodiments. In operation, the computing device is to perform flow 650, either according to instructions loaded form a non-transitory computer readable medium (e.g., flash memory, DVD, ROM), or implemented directly in hardware. As shown, after starting, the computing device at 652 is to scan a network. At 654 the computing device is to discover all IoT devices on the network. A flow for scanning and discovering IoT devices according to some embodiments is illustrated and described with respect to FIG. 7.

At 656, the computing device is to generate a signature unique to the device type of the discovered IoT device. Disclosed embodiments include different ways of generating the unique signature. For example, the computing device can generate the unique signature based on the IP address of the IoT device. In some embodiments, the unique signature can also (or instead) reflect the MAC address of a network interface of the IoT device. In some embodiments, the unique signature can reflect a timestamp of when the IoT device is discovered, the timestamp to be added to the unverified Block Chain at operation 676 when the device is being newly added to the unverified Bock Chain.

In some embodiments the unique device type signature is a combination of part of MAC address, OS, OS version, ports, protocols, and source and destination URLs.

In some embodiments, the unique signature can reflect a location of the IoT device when the IoT device is discovered, the location to be added to the unverified Block Chain at operation 676 when the device is being newly added to the unverified Bock Chain. In some embodiments, the location can be used when dynamically generating a Block Chain proximal to a user, for example, as described above with respect to FIG. 2B.

At 658, the computing device is to determine, for example using the unique device signature, whether the IoT device is already in the verified Block Chain. If so, the computing device at 660 is to lookup the IoT device and return the device information from the listing.

In some embodiments, at 661, the computing device is to determine whether to share the device information, including, for example, one or more of a physical location (e.g., GPS coordinates) of the IoT device, the device type, and the creation timestamp. For example, in some embodiments, the computing device adheres to a global access policy, which calls for sharing the details of any discovered IoT device. In some embodiments, the global access policy calls for sharing the details of discovered IoT devices to which access is authorized according to an access policy. Operation 661 is optional, as indicated by its dashed border, insofar as it may occur at a different time, or not at all. The flow then proceeds to 678.

Returning to operation 658, if the computing device determines that the IoT device is not already in the verified Block Chain, the computing device is to determine at 667 whether the IoT device is already in the unverified Block Chain.

If the IoT device at 667 is determined to already be in the unverified Block Chain, and if the IoT device does not already have a confirmed device type in the unverified Block Chain, the computing device at 664 is to guess a device type. The computing device can make an educated guess at the device type by analyzing the mac address, the operating system type, and the ports, protocols, and source/destination URLs of packets. The traits of a particular device can be compared to the traits of devices already in the verified Block Chain, for example, by analyzing a header of a TCP/IP packet. In another example, an IoT device receiving a TCP/IP packet on any of ports 9100, 9101, and 9102 is likely to be a printer. Similarly, TCP ports 1 through 1023 can be reserved addresses likely to involve a well-known TCP service, which the computing device can use to guess the device type.

In some embodiments, at 666 the computing device is to attempt to confirm the device type. Operations 664 and 666 are optional, as indicated by their dashed border, insofar as the unverified Block Chain may already include a device type for the IoT device. The flow then proceeds to 668.

At 668, the computing device is to increment the counter for the record in the unverified Block Chain. At 670, the computing device is to determine whether the counter has reached a verification threshold, and if not, the flow proceeds to 678. But if so, at 672 the computing device is to add the entry to the verified Block Chain. The flow then proceeds to 678.

Returning now to the determination made at 667, if the IoT device is determined to not be in the unverified Block Chain, the computing device at 673 is to guess a device type, similarly to the guessing described above with respect to operation 664. At operation 674, the computing device is to attempt to confirm the device type. This operation is similar to operation 666, described above. In some embodiments, the computing device also determines at operation 674 whether to share the device information, including, for example, one or more of a physical location/coordinates of the IoT device, the device type, and the creation timestamp.

At 675, the computing device is to set access and share policies for the IoT device. For example, the computing device can determine whether to allow access and share IoT devices based on the device type. Or, the computing device can determine whether to allow access and share IoT device information based on characteristics of the network: a globally accessible network would have higher access and sharing privileged than a small, corporate network. Or, the computing device can determine whether to allow access and share IoT devices based on the location of the IoT device: a WIFI router at a sports stadium would likely allow free and open, shared access to people in the stadium. Or, the computing device can determine whether to allow access and share IoT device information based on the access privileges of an owner of the IoT device.

At 676, the computing device is to create a new entry in the unverified Block Chain with a counter set to one, and the device type set to the suggested one or to one provided by the user. In some embodiments, the computing device also adds a location, such as GPS coordinates, of the IoT device to the entry. In some embodiments, the computing device also adds a timestamp indicating when the entry was created. The flow then proceeds to 678.

At 678, the computing device is to determine whether any more IoT devices remain to analyze, and if so, to return to 656 to start executing the flow 650 on the next IoT device, and, if not, the flow proceeds to operation 680.

In some embodiments, before ending, the computing device at 680 synchronizes both versions of its Block Chain—verified and unverified—if it is an appropriate time to synchronize, with one or more other nodes at the same or different levels of hierarchy. In some embodiments, after synchronizing the Block Chains of a first and second node, the computing device is to generate und subsequently use a new Block Chain that is the union of the two Block Chains. In other embodiments, after synchronizing the Block Chains, be they verified or unverified, of a first and second node, the computing device is to generate und subsequently use a new Block Chain that is the intersection of the two Block Chains. In some embodiments, when synchronizing unverified Block Chains in a first and a second node with respect to an IoT device, the unverified Block Chain having a higher count is selected.

The Block Chain synchronization process can include many checking and verification steps. For example, if two independent nodes have incremented counter for same IoT device then during synch these two entries are merged with final counter becoming the sum of the two counters.

If there is a conflict between the two version of verified Block Chains, then the Block Chain with the earliest timestamp wins.

Discovering Iot Devices on the Network

Figure 7:
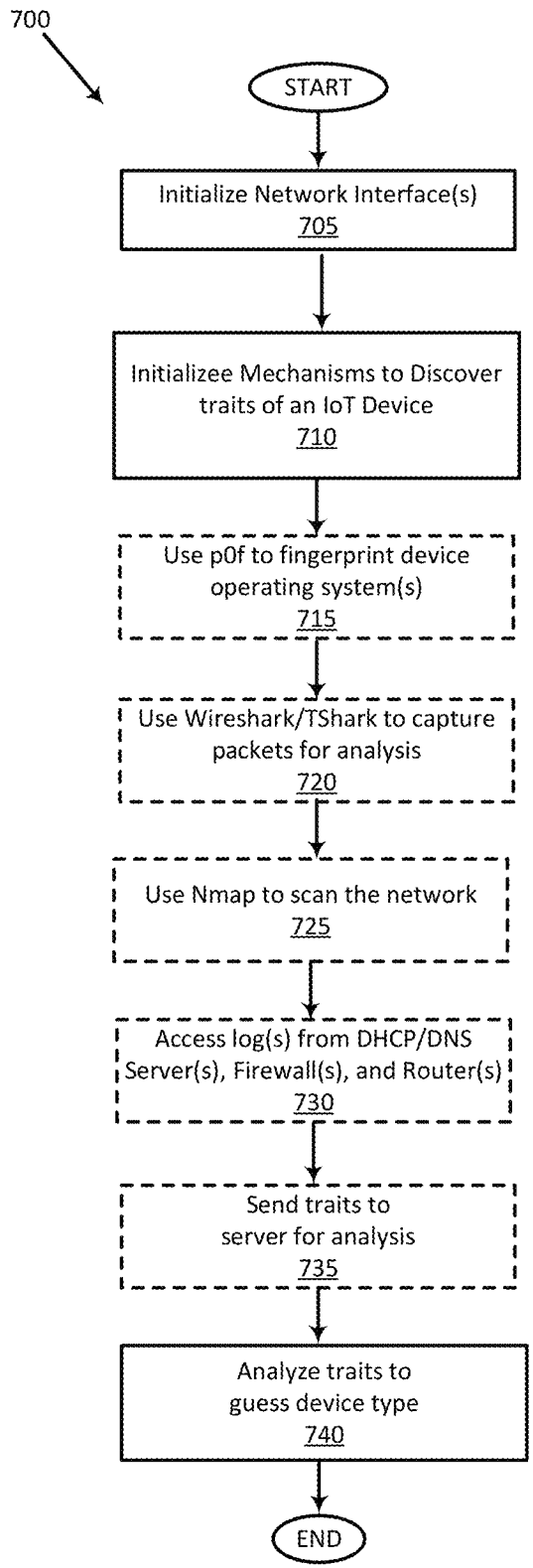
FIG. 7 is a flow diagram illustrating a process to scan a network to discover IoT devices, according to some embodiments.

Disclosed embodiments can use multiple techniques to discover IoT devices on the network. FIG. 7 is a flow diagram illustrating a process of discovering IoT devices on a network. In operation, the computing device is to perform flow 700, either according to instructions loaded form a non-transitory computer readable medium (e.g., flash memory, ROM, DVD, HD), or implemented directly in hardware. As shown, a computing device performs flow 700 starting at 705 by initializing its multiple network interfaces (such as network interface(s) 116 of FIG. 1) to assist in gathering data and discovery of IoT devices. In some embodiments, one or more of the multiple network interfaces is in monitor mode, and sees the entire traffic that is being port mirrored. In some embodiments, another one or more of the multiple network interfaces is in a regular interface setup, having an IP address to a port to receive data (e.g., logs) from various networking services/devices such as a DHCP server, DNS servers, a firewall, routers, switches, etc.

At 710, the computing device is to initiate network traffic monitoring. Disclosed embodiments can use one or more techniques, such as those performed at operations 715, 720, 725, and 730, to gather, listen to, and/or monitor traffic received over its network interfaces.

In some embodiments, at 715, the computing device is to use p0f to fingerprint operating system(s) of one or more monitored devices. p0f is a passive TCP/IP stack fingerprinting tool to be run on the computing device, and, among its multiple capabilities, can analyze network traffic, including raw packet data, and attempt to identify the operating system running on machines that send the network traffic to the computing device.

In some embodiments, at 720, the computing device is to use Wireshark®/TShark to capture packets from particular flows for analysis. Wireshark® is a network packet analyzer that allows network interfaces see all the traffic visible to them. In some embodiments, Wireshark® has a graphical user interface. TShark is a terminal-oriented version of Wireshark® that captures network packets without a user interface. Using Wireshark®/TShark, the computing device can gather information about the IP addresses of the device, MAC address of the device and some header information such as "User-Agent" among others.

In some embodiments, at 725, the computing device is to use Nmap (Network Mapper) to scan the network. Nmap is a network scanning and host detection tool. In some embodiments, the computing device uses multiple threads of Nmap scans to even better identify more details about the device such as: OS, possible manufacturer (from MAC address and other Nmap fingerprinting techniques), services running on the device, ports open on the device, and so on.

In some embodiments, at 730, the computing device is to gather logs from DHCP (Dynamic Host Configuration Protocol) and DNS (Domain Name System) servers, one or more firewalls, and one or more routers. DHCP is a tool by which a server dynamically assigns an IP address and other network configuration parameters to each device on a network. DNS is a system for converting alphabetic names into numeric IP addresses. In some embodiments, DHCP server, DNS server, firewall, and router logs and can be analyzed to derive additional information, such as device names.

In some embodiments, at 735, the computing device is to send data collected during operations 715, 720, 725, and 730 to a server for analysis. For example, with reference to FIG. 3A, computing device 302 can send collected data to server 340 for analysis. In some embodiments, the collected data is analyzed by both the computing device itself and the server. The Block Chain maintained by the computing device may be more recent, and have less historical data than the Block Chain maintained by the server. In some embodiments, the server maintains a super Block Chain that is at a level of hierarchy above the Block Chain of the computing device.

At 740, the computing device (and/or the server) is to analyze collected data gathered during one or more of operations 715, 720, 725, and 730 to make an educated guess at what the device type could be. For example, the computing device (and/or the server) can compare traits of a monitored IoT device against traits of devices already included in the Block Chain, be it a verified or an unverified Block Chain. Devices with similar traits are expected to likely be of the same type.

Figure 8:
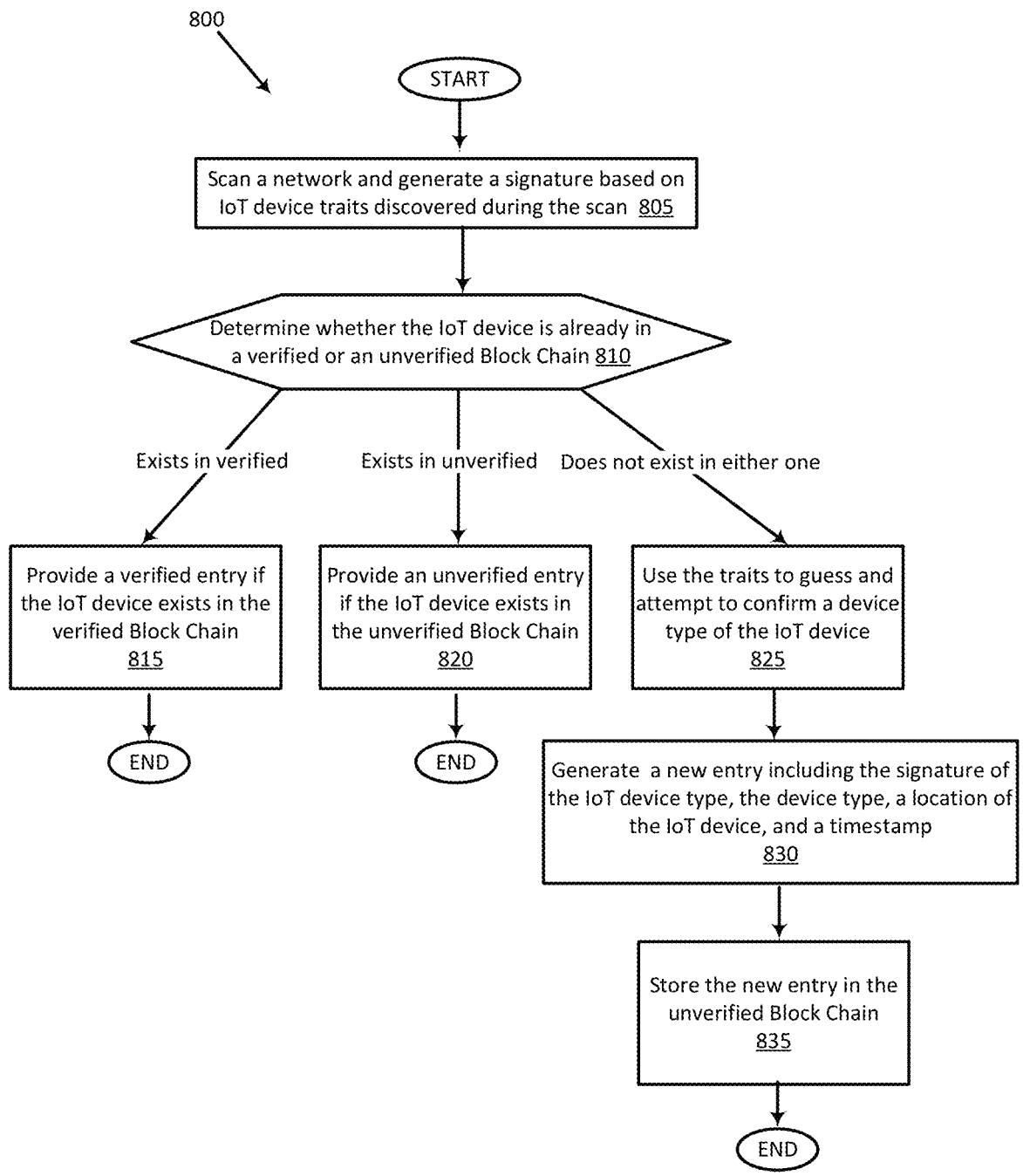
FIG. 8 is a flow diagram illustrating a process to analyze an IoT device, according to some embodiments.

FIG. 8 is a flow diagram illustrating a process to analyze an IoT device, according to some embodiments. In operation, the computing device is to perform flow 800, either according to instructions loaded from memory or other non-transitory computer readable medium, or implemented directly in hardware, on each discovered IoT device in the network. At 805, the computing device is to scan a network and generate a signature based on IoT device traits discovered during the scan. For example, the computing device, as illustrated and described with respect to FIG. 7, can discover the traits using one or more of several mechanisms to collect data network data. At 810, the computing device is to determine whether the IoT device is already in a verified or an unverified Block Chain.

At 815, if the IoT device exists in the verified Block Chain, the computing device is to provide a verified entry.

At 820, if the IoT device exists in the unverified Block Chain, the computing device is to provide an unverified entry.

At 825, if the IoT device does not exist in either the verified or the unverified Block Chain, the computing device is to use the traits to guess and attempt to confirm a device type of the IoT device. For example, the computing device can guess the device type in the same or similar way as in operation 673 of FIG. 6B. Then, at 830, the computing device is to generate a new entry including the device type, a location of the IoT device, and a timestamp. Then, at 835, the computing device is to store the new entry in the unverified Block Chain.

Further Examples

Example 1 provides an exemplary method of discovering an Internet of Things (IoT) device type, the method including: scanning a network and generating a signature based on IoT device traits discovered during the scan, determining whether the signature is already in a verified or an unverified Block Chain, when the signature exists in the verified Block Chain, providing a verified entry comprising at least the IoT device type, otherwise, when the signature exists in the unverified Block Chain, providing an unverified entry comprising at least the IoT device type, incrementing a verification count associated with the unverified entry, and promoting the unverified entry to the verified Block Chain when the verification count reaches a verification threshold, and otherwise, when the IoT device signature is not already in the verified or unverified Block Chains, using the traits to guess and attempt to confirm the IoT device type, generating a new entry comprising the IoT device type, a location of the IoT device, and a timestamp, and storing the new entry in the unverified Block Chain.

Example 2 includes the substance of the exemplary method of Example 1, wherein discovering the traits includes collecting data using p0f to fingerprint an operating system of the IoT device.

Example 3 includes the substance of the exemplary method of Example 1, wherein discovering the traits includes collecting data using TShark to capture packets received from the IoT device.

Example 4 includes the substance of the exemplary method of Example 1, wherein discovering the traits includes collecting data using Nmap to scan the network.

Example 5 includes the substance of the exemplary method of Example 1, wherein discovering the traits includes receiving logs from one or more DHCP (Dynamic Host Configuration Protocol) and DNS (Domain Name System) servers, one or more firewalls, and one or more routers.

Example 6 includes the substance of the exemplary method of claim 1, wherein discovering the traits includes collecting data using p0f to fingerprint an operating system of the IoT device, collecting data using TShark to capture packets received from the IoT device, and collecting data using Nmap to scan the network, and receiving logs from one or more DHCP (Dynamic Host Configuration Protocol) and DNS (Domain Name System) servers, one or more firewalls, and one or more routers.

Example 7 includes the substance of the exemplary method of Example 1, further including sending the traits to a server for analysis.

Example 8 includes the substance of the exemplary method of Example 6, wherein guessing the device type includes using the traits to identify an IoT device in one or both of the verified and the unverified Block Chains having similar traits.

Example 9 provides an exemplary computing device including multiple network interfaces and a processor to: discover traits of an Internet of Things (IoT) device by scanning a network and generating a signature based on IoT device traits discovered during the scan, determining whether the signature is already in a verified or an unverified Block Chain, when the signature exists in the verified Block Chain, providing a verified entry comprising at least the IoT device type, otherwise, when the signature exists in the unverified Block Chain, providing an unverified entry comprising at least the IoT device type, incrementing a verification count associated with the unverified entry, and promoting the unverified entry to the verified Block Chain when the verification count reaches a verification threshold, and otherwise, when the IoT device signature is not already in the verified or unverified Block Chains, using the traits to guess and attempt to confirm the IoT device type, generating a new entry comprising the IoT device type, a location of the IoT device, and a timestamp, and storing the new entry in the unverified Block Chain.

Example 10 includes the substance of the exemplary computing device of Example 9, wherein discovering the traits includes collecting data using p0f to fingerprint an operating system of the IoT device.

Example 11 includes the substance of the exemplary computing device of Example 9, wherein discovering the traits includes collecting data using TShark to capture packets received from the IoT device.

Example 12 includes the substance of the exemplary computing device of Example 9, wherein discovering the traits includes collecting data using Nmap to scan the network.

Example 13 includes the substance of the exemplary computing device of Example 9, wherein discovering the traits includes receiving logs from one or more DHCP (Dynamic Host Configuration Protocol) and DNS (Domain Name System) servers, one or more firewalls, and one or more routers.

Example 14 includes the substance of the exemplary computing device of Example 9, wherein discovering the traits includes collecting data using p0f to fingerprint an operating system of the IoT device, collecting data using TShark to capture packets received from the IoT device, and collecting data using Nmap to scan the network, and receiving logs from one or more DHCP (Dynamic Host Configuration Protocol) and DNS (Domain Name System) servers, one or more firewalls, and one or more routers.

Example 15 includes the substance of the exemplary computing device of Example 9, further including sending the traits to a server for analysis.

Example 16 includes the substance of the exemplary computing device of Example 14, wherein guessing the device type includes using the traits to identify an IoT device in one or both of the verified and the unverified Block Chains having similar traits.

Example 17 provides an exemplary non-transitory computer-readable medium containing instructions to which a computing device is to respond by: scanning a network and generating a signature based on IoT device traits discovered during the scan, determining whether the signature is already in a verified or an unverified Block Chain, when the signature exists in the verified Block Chain, providing a verified entry comprising at least the IoT device type, otherwise, when the signature exists in the unverified Block Chain, providing an unverified entry comprising at least the IoT device type, incrementing a verification count associated with the unverified entry, and promoting the unverified entry to the verified Block Chain when the verification count reaches a verification threshold, and otherwise, when the IoT device signature is not already in the verified or unverified Block Chains, using the traits to guess and attempt to confirm the IoT device type, generating a new entry comprising the IoT device type, a location of the IoT device, and a timestamp, and storing the new entry in the unverified Block Chain.

Example 18 includes the substance of the exemplary non-transitory computer-readable medium of Example 17, wherein discovering the traits includes collecting data using p0f to fingerprint an operating system of the IoT device, collecting data using TShark to capture packets received from the IoT device, and collecting data using Nmap to scan the network, and receiving logs from one or more DHCP (Dynamic Host Configuration Protocol) and DNS (Domain Name System) servers, one or more firewalls, and one or more routers.

Example 19 includes the substance of the exemplary non-transitory computer-readable medium of Example 17, further including sending the traits to a server for analysis.

Example 20 includes the substance of the exemplary non-transitory computer-readable medium of Example 17, wherein guessing the device type includes using the traits to identify an IoT device in one or both of the verified and the unverified Block Chains having similar traits.

What is claimed is:

1. A method comprising:
   discovering one or more traits of a device on a network and generating a signature based on the discovered one or more traits;
   determining if the generated signature is in a Block Chain;
   in response to determining that the generated signature exists in a verified Block Chain, providing a verified entry comprising at least device information;
   in response to determining that the generated signature exists in an unverified Block Chain, providing an unverified entry comprising at least the device information, incrementing a verification count associated with the unverified entry, and promoting the unverified entry to the verified Block Chain when the verification count reaches a threshold; and
   in response to determining that the device is not already in the verified Block Chain or the unverified Block Chain, using the traits to attempt to confirm device information, generating an entry comprising at least one of the signature of the device, the a device type, a device counter, a location of the device, and a timestamp, and storing the entry in the unverified Block Chain.

2. The method of claim 1, wherein discovering the one or more traits and generating the signature comprises analyzing network traffic, including packet data received from the device, and gathering characteristics regarding the device, the characteristics comprising one or more of a MAC (Media Access Control) address, an IP (Internet Protocol) address, open port, a protocol, and source and destination URLs (Uniform Resource Locators).

3. The method of claim 2, wherein discovering the one or more traits and generating the signature further comprises attempting to identify an operating system (OS), an OS version, and a manufacturer of the device.

4. The method of claim 3, wherein discovering the one or more traits and generating the signature further comprises receiving and analyzing logs from one or more DHCP (Dynamic Host Configuration Protocol) and DNS (Domain Name System) servers, one or more firewalls, and one or more routers.

5. The method of claim 4, further comprising:
   guessing the device type by using the signature to identify the device type in one or both of the verified and the unverified Block Chains, the signature having been generated based on analysis of traits comprising a location, a MAC address, an IP address, a manufacturer, an OS (operating system), an OS version, ports that are open, a network protocol, and source and destination URLs (Uniform Resource Locators).

6. The method of claim 1, wherein the verified Block Chain is immutable, requiring administrative privileges to be modified, and wherein dynamically changing fields of the verified entry, including the location, are not included in the providing.

7. The method of claim 1, further comprising synchronizing the verified and unverified Block Chains with a plurality of additional, geographically-dispersed instances of each.

8. The method of claim 7, further comprising using a process to confirm accuracy and detect an attempt to maliciously update the verified Block Chain, wherein the process comprises comparing the verified Block Chain with each of the plurality of additional instances of the verified Block Chain.

9. A computing device comprising:
a processor to execute instructions;
memory to store the instructions, wherein when the stored instructions are executed by the processor a method is performed, the method comprising:
discovering one or more traits of a device on a network and generating a signature based on the discovered one or more traits;
determining if the generated signature is in a Block Chain;
in response to determining that the generated signature exists in a verified Block Chain, providing a verified entry comprising at least device information;
in response to determining that the generated signature exists in an unverified Block Chain, providing an unverified entry comprising at least the device information, incrementing a verification count associated with the unverified entry, and promoting the unverified entry to the verified Block Chain when the verification count reaches a threshold; and
in response to determining that the device is not already in the verified Block Chain or the unverified Block Chain, using the traits to attempt to confirm device information, generating an entry comprising at least one of the signature of the device, a device type, a device counter, a location of the device, and a timestamp, and storing the entry in the unverified Block Chain.

10. The computing device of claim 9, wherein discovering the one or more traits and generating the signature comprises analyzing network traffic, including packet data received from the device, and gathering characteristics regarding the device, the characteristics comprising a MAC (Media Access Control) address, an IP (Internet Protocol) address, open ports, a protocol, and source and destination URLs (Uniform Resource Locators).

11. The computing device of claim 10, wherein discovering the one or more traits and generating the signature further comprises attempting to identify an operating system (OS), an OS version, and a manufacturer of the device.

12. The computing device of claim 11, wherein discovering the one or more traits and generating the signature further comprises receiving and analyzing logs from one or more DHCP (Dynamic Host Configuration Protocol) and DNS (Domain Name System) servers, one or more firewalls, and one or more routers.

13. The computing device of claim 12, further comprising:
guessing the device type by using the signature to identify IoT device type in one or both of the verified and the unverified Block Chains, the signature having been generated based on analysis of traits comprising a location, a MAC address, an IP address, a manufacturer, an OS (operating system), an OS version, ports that are open, a network protocol, and source and destination URLs (Uniform Resource Locators).

14. The computing device of claim 9, wherein the verified Block Chain is immutable, requiring administrative privileges in order be modified, and wherein dynamically changing fields of the verified entry, including the location, are not included in the providing.

15. The computing device of claim 9, wherein the computing device is further to synchronize the verified and unverified Block Chains with a plurality of additional, geographically-dispersed instances of each.

16. The computing device of claim 15, wherein the computing device is further to use a process to confirm accuracy and detect an attempt to maliciously update the verified Block Chain, wherein the process comprises comparing the verified Block Chain with each of the plurality of additional instances of the Block Chain.

17. A non-transitory computer-readable medium containing instructions to which a computing device is to execute a method comprising:
discovering one or more traits of a device on a network and generating a signature based on the discovered one or more traits;
determining if the generated signature is in a Block Chain;
in response to determining that the generated signature exists in a verified Block Chain, providing a verified entry comprising at least device information;
in response to determining that the generated signature exists in an unverified Block Chain, providing an unverified entry comprising at least the device information, incrementing a verification count associated with the unverified entry, and promoting the unverified entry to the verified Block Chain when the verification count reaches a threshold; and
in response to determining that the device is not already in the verified Block Chain or the unverified Block Chain, using the traits to attempt to confirm device information, generating an entry comprising at least one of the signature of the device, a device type, a device counter, a location of the device, and a timestamp, and storing the entry in the unverified Block Chain.

18. The non-transitory computer-readable medium of claim 17, wherein the verified Block Chain is immutable, requiring administrative privileges in order be modified, and wherein dynamically changing fields of the verified entry, including the location, are not included in the providing.

19. The non-transitory computer-readable medium of claim 17, wherein the computing device is to further respond to the instructions by synchronizing the verified and unverified Block Chains with a plurality of additional, geographically-dispersed instances of each.

20. The non-transitory computer-readable medium of claim 17, wherein the computing device is to further respond to the instructions by using a process to confirm accuracy and detect an attempt to maliciously update the verified Block Chain, wherein the process comprises comparing the verified and unverified Block Chains with a plurality of additional, geographically-dispersed instances of each.

* * * * *